Aug. 22, 1961　　　J. R. CLIFTON, SR., ET AL　　　2,997,121
MOTOR VEHICLE FOR MOVING AIRCRAFT ON THE GROUND
Filed Aug. 14, 1958　　　　　　　　　　　　　5 Sheets-Sheet 1
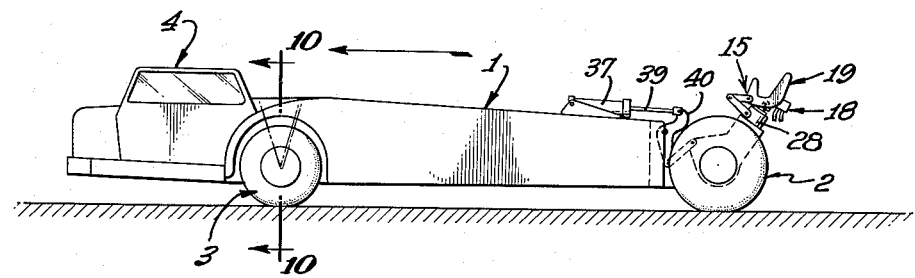
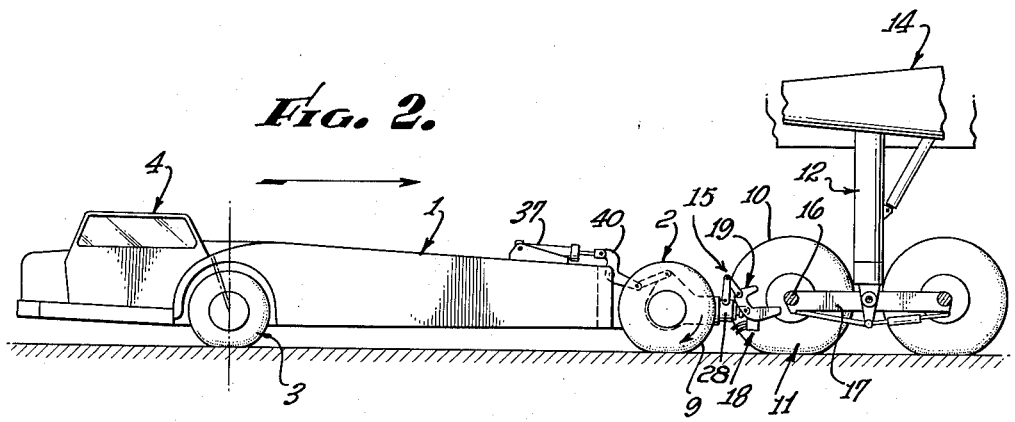
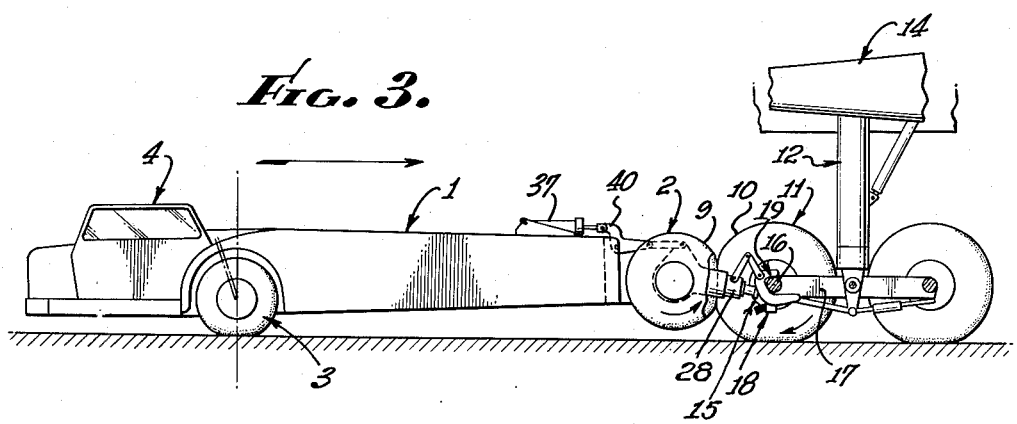
INVENTOR.
JOHN R. CLIFTON, SR.
AULDIN D. NOLAN
BY Paul A. Weilein
ATTORNEY.

Aug. 22, 1961    J. R. CLIFTON, SR., ET AL    2,997,121
MOTOR VEHICLE FOR MOVING AIRCRAFT ON THE GROUND
Filed Aug. 14, 1958                  5 Sheets-Sheet 2
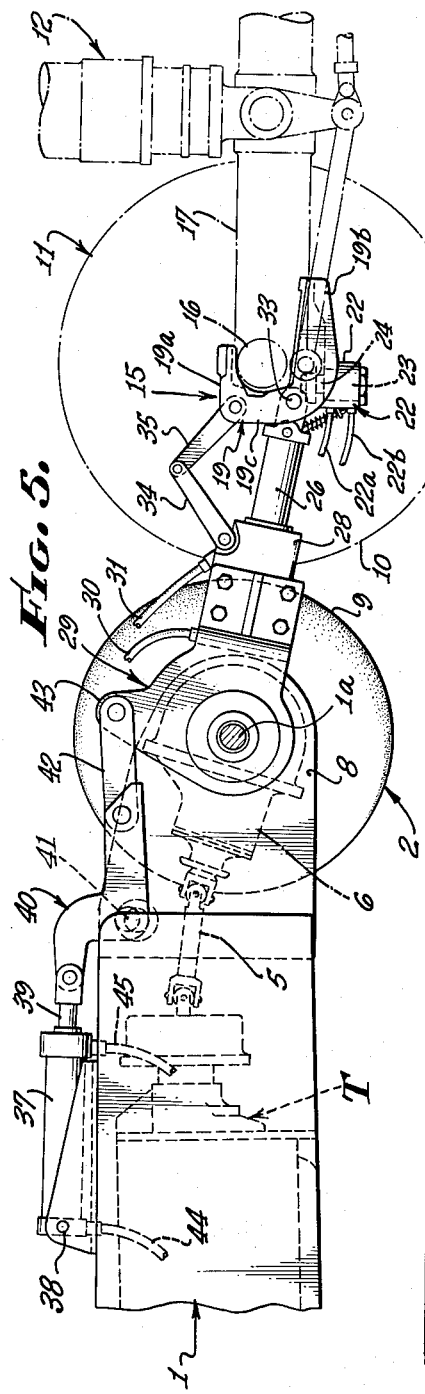
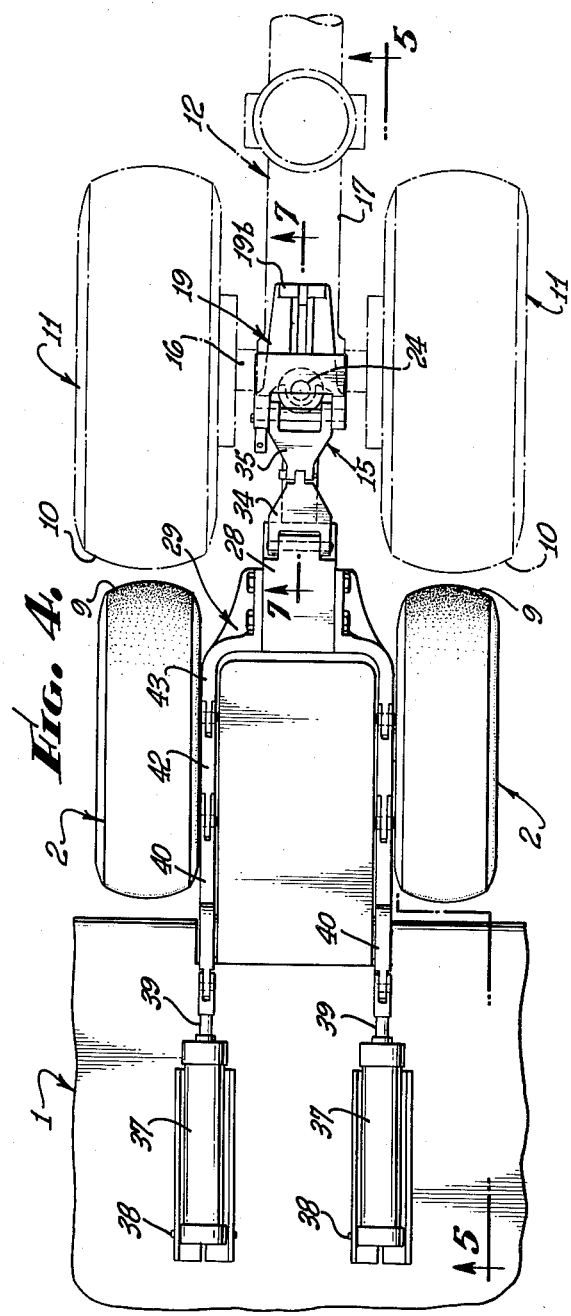
INVENTOR.
JOHN R. CLIFTON, Sr.
AULDIN D. NOLAN
BY Paul A. Weilein
ATTORNEY.

Aug. 22, 1961 J. R. CLIFTON, SR., ET AL 2,997,121
MOTOR VEHICLE FOR MOVING AIRCRAFT ON THE GROUND
Filed Aug. 14, 1958 5 Sheets-Sheet 3
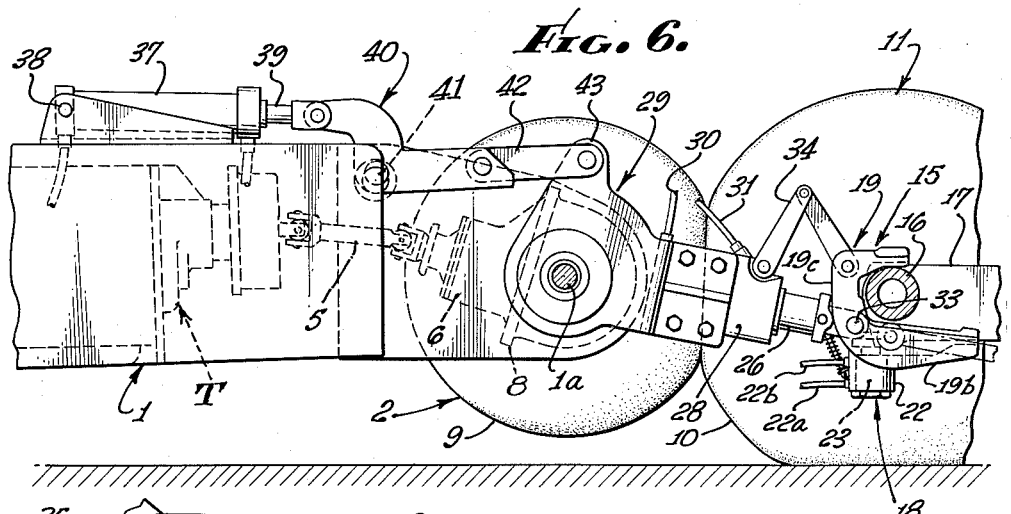
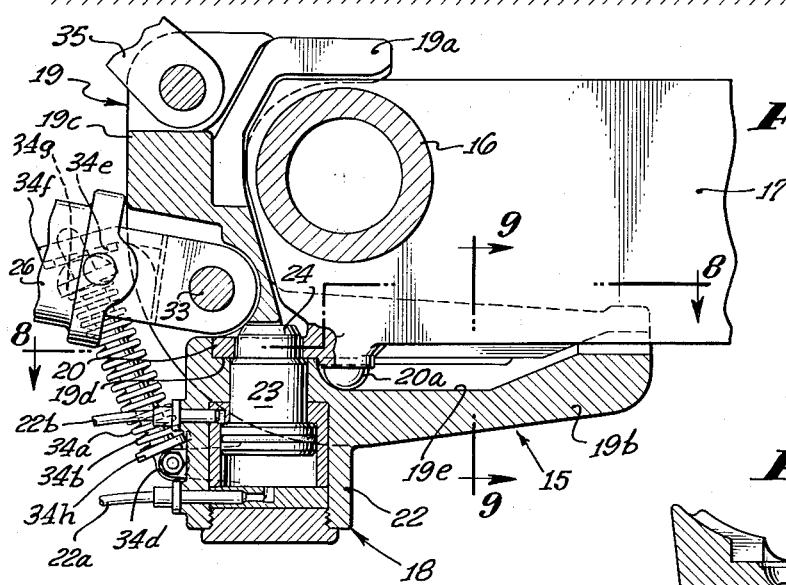
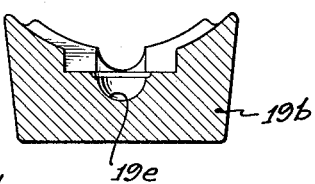
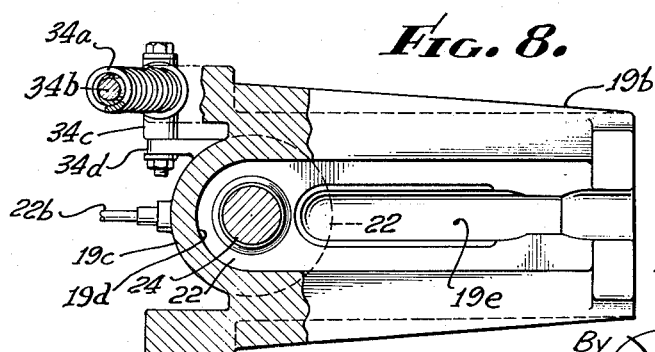
INVENTOR.
JOHN R. CLIFTON, Sr.
AULDIN D. NOLAN
By Paul A. Weilein
ATTORNEY.

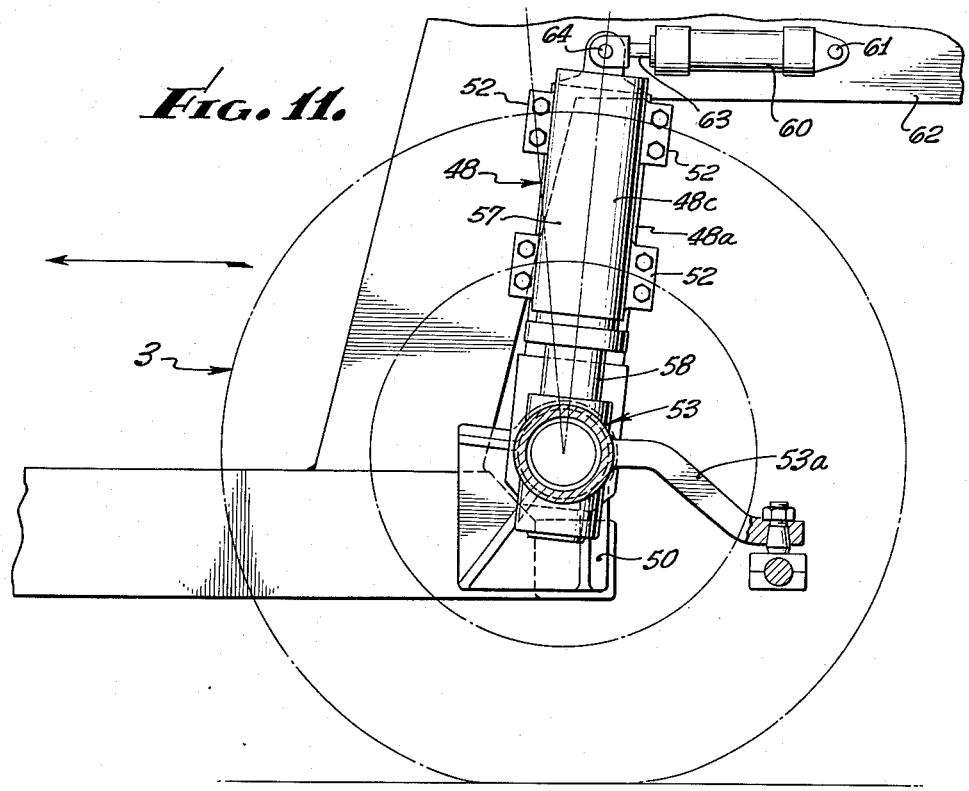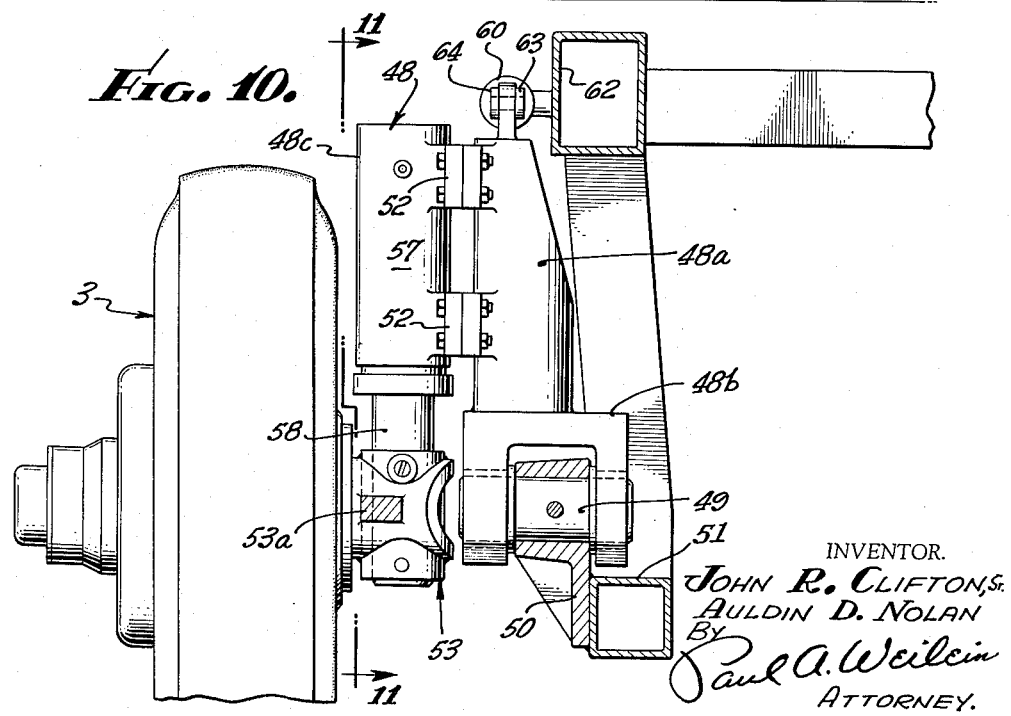

Aug. 22, 1961  J. R. CLIFTON, SR., ET AL  2,997,121
MOTOR VEHICLE FOR MOVING AIRCRAFT ON THE GROUND
Filed Aug. 14, 1958  5 Sheets-Sheet 5

FIG. 12.

INVENTOR.
JOHN R. CLIFTON, Sr.
AULDIN D. NOLAN
By Paul A. Weilein
ATTORNEY.

United States Patent Office 2,997,121
Patented Aug. 22, 1961

2,997,121
MOTOR VEHICLE FOR MOVING AIRCRAFT ON THE GROUND
John R. Clifton, Sr., Rolling Hills, and Auldin D. Nolan, Palos Verdes Estates, Calif., assignors to Air Logistics Corporation, Pasadena, Calif., a corporation of Delaware
Filed Aug. 14, 1958, Ser. No. 754,946
27 Claims. (Cl. 180—12)

This invention relates to a motor vehicle for moving large and heavy jet and turbo-prop operated aircraft along the ground without utilizing the engines of such aircraft.

The need for such a vehicle is readily appreciated in consideration of the fact that the noise and heat blasts from jet engines are intolerable in most ramp areas. Noxious fumes from jet engines in such areas and adjacent airport buildings are objectionable and may become harmful. Moreover, taxiing with jet engines results in consumption of large amounts of valuable fuel and shortens the flight life of the engines.

Vehicles heretofore employed for towing heavy jet operated aircraft have partially solved the problem of ground movement without employing the engines of the aircraft, but these vehicles must be exceptionally heavy to provide traction sufficient to effect movement of the aircraft without damage of the landing gears and at best have been uncertain as to performance especially on runways covered with ice, snow or oil deposits, due to lack of adequate traction.

Other objections to such towing vehicles are the slow towing speed thereof, lack of maneuverability, and the fact that the entire responsibility is imposed upon the driver thereof, leaving the pilot of the aircraft without command as to movement of the aircraft. This can prove dangerous, as among other hazards entailed, an overriding application of the aircraft brakes by the pilot may cause severe loads to be transmitted to the landing gear.

The time required to effect adequate ramp movement of large jet operated aircraft is most important, and as towing vehicles heretofore employed have been exceptionally slow, the time penalty incurred before take-off and after landing, seriously curtails the block-to-block speed of jet operations and curtails aircraft availability.

A motor vehicle for moving aircraft of the character described on the ground forms the subject matter of the pending application for patent, Serial Number 585,848, filed May 18, 1956 by John R. Clifton, Sr. This vehicle is provided with means whereby driven ground-engaging wheel means of the vehicle may be elevated from the ground and held in frictional driving engagement with wheel means of the landing gear of the aircraft. Driven in this manner, the landing gear wheel means will propel the aircraft along the ground, the motor vehicle being then towed or pushed, depending upon the direciton of movement of the aircraft.

Having a low ratio of weight to the weight of the heavy aircraft, the above described vehicle makes it possible to move the aircraft with greater efficiency, economy, and at higher speeds than possible with towing vehicles. These advantages are achieved in part by driving the wheel means of the landing gear in the manner above noted so as to utilize weight of the aircraft to provide the traction essential to moving extremely heavy aircraft at desired speed.

It is an object of the present invention to provide a motor vehicle of the character described which constitutes an improvement in this art in point of efficiency and economy of operation, nicety and accuracy of control, greater manueuverability, safety of movement of the aircraft at higher speeds than heretofore, full and accurate control of all of the functions of the vehicle from the driver's cab and provision for steering the aircraft from the pilots cabin of the aircraft.

It is another object of the present invention to provide in a motor vehicle such as described, novel coupling means readily operable from the the driver's cab of the vehicle to effect a releasable draft connection between the vehicle and an aircraft to be moved along the ground.

It is an additional object of this invention to provide in a motor vehicle such as next above described, novel power operated positioning means operable from the driver's cab of the vehicle in association with the coupling means to elevate one end of the vehicle to dispose driven wheels thereof off the ground and in position to be moved into frictional driving engagement with wheels of the landing gear of the aircraft.

It is another object of this invention to provide a motor vehicle such as described wherein novel power operated crowding means associated with the aforesaid positioning means and coupling means, is operable from the driver's cab of the vehicle to urge the elevated wheels of the vehicle into frictional driving engagement with the wheels of the landing gear and to maintain these wheels under pressure in such frictional engagement as will assure an effective driving of the landing gear wheels for moving the aircraft along the ground under control as to steering by the pilot of the aircraft.

An additional object of this invention is the provision in a motor vehicle such as described of novel means for changing the caster angle of the ground engaging trailing wheels of the vehicle with resultant free tracking after vehicle wheels relative to the aircraft, according to the direction of travel of the vehicle, thereby eliminating the imposition of undue loads on the landing gear of the aircraft, in making tight turns regardless of speed or direction of travel.

Another object of this invention is the provision in a motor vehicle of the character described, of novel means which when the gear shift means of the vehicle is operated to change the direction of rotation of the driven wheels of the vehicle, will dispose the trailing wheels at the proper caster angle, while the driven wheels are on the ground as well as while the driven wheels are disposed in frictional driving engagement with wheels of the landing gear.

A further object hereof is to provide in a motor vehicle such as described novel caster angle control means which in response to operation of the coupling means to effect a draft connection between the vehicle and the landing gear, will cooperate with the means for changing the caster angle in a manner assuring that the trailing wheels of the vehicle will be disposed at the proper caster angle regardless of the direction in which the aircraft is moved.

An additional object of this invention is to provide a motor vehicle such as described wherein novel locking means in association with the coupling means, is operable from the cab of the vehicle to releasably lock the vehicle in coupled relation to the landing gear of an aircraft so that the vehicle in effect will become a source of propulsion power for the aircraft virtually integral therewith and over which the pilot of the aircraft has full command in steering the aircraft along the ground, as though the aircraft were propelled by its own engines.

Another object is to provide in a motor vehicle such as described a novel arrangement of correlated hydraulic circuits and hydraulically operated devices for actuating the coupling means, the positioning means, the crowding means, the coupling locking means, the castering means, the vehicle steering means and the controls for the castering means, all subject to selective operation from the cab of the vehicle.

It is further object of this invention to provide a motor vehicle which also may be employed to push or tow smaller aircraft.

Another object of this invention is to provide a motor vehicle such as described which optionally may be steered by the driver of the vehicle while coupled with the landing gear wheels of an aircraft, or may be caused to trail or to be pushed by the aircraft when coupled thereto while the aircraft is steered by the pilot in the aircraft.

It is another object of this invention to provide a vehicle such as described, which is constructed, arranged, and operated so that it is capable of moving aircraft having gross weight of the order of 300,000 pounds and upward, at speeds from "inching" up to, for example, 25 miles per hour and better, without "chatter" or imposing undue strains on the aircraft.

It is a further object of the invention to provide a motor vehicle such as described wherein the coupling means readily lends itself to modification or replacement for effecting a draft connection of the vehicle with aircraft having landing gear of different forms.

It is another object of this invention to provide a motor vehicle such as described which is constructed and arranged to readily lend itself to the incorporation therein and in the aircraft of suitable control means which will enable the pilot of the aircraft to have control of an operation of the vehicle incident to the vehicle being coupled to the landing gear of the aircraft.

Another object of this invention is to provide a motor vehicle for the purposes described which is of such low height that it readily may be driven under the aircraft for connection with any of landing wheels depending upon the type of aircraft, and operated when thus connected to propel the aircraft at the desired speeds either forwardly or rearwardly.

It is another object of this invention to provide a motor vehicle such as described wherein a novel control for the power steering means thereof, optionally, through manipulation of valve means, may be rendered operable in response to the turning effort imposed on the vehicle from the aircraft, to free the trailing wheels of the vehicle from the imposition of any load derived from the mechanical steering means embodied in the power steering system, thereby making it possible for the wheels to track freely with respect to the aircraft being moved by the vehicle.

It is another object of the present invention to provide a motor vehicle of the character described which will enable heavy aircraft to be accurately and safely positioned relative to loading facilities and maintenance docks. A direct consequence of this capability will offer conspicuous space saving in aforesaid loading and maintenance areas.

Another object of this invention is to provide a motor vehicle of the character described which will enable aircraft to be moved without the use of a tow-bar connected between aircraft and vehicle and thereby eliminate hazards such as "jack-knifing" as well as the inconvenience of handling generally associated with towbars.

Referring to the drawings:

FIG. 1 is a schematic side elevation of a motor vehicle embodying the present invention, the double dot-dash lines on one of the steerable wheels indicating the proper caster angle of the steerable wheels while the vehicle is being driven in the direction indicated by the arrow appearing above the vehicle.

FIG. 2 is a schematic side elevation similar to FIG. 1 showing how the vehicle may be driven in the reverse direction to that shown in FIG. 1, as indicated by the arrow above the vehicle; the double dot-dash lines on one of the wheels indicating the caster angle of the steerable wheels when moving in said direction, the coupling means being shown in position to be coupled to the landing gear of an aircraft;

FIG. 3 is a schematic side elevation of the vehicle shown in FIGS. 1 and 2 as it would appear when coupled to aircraft landing gear with the driven wheels of the vehicle elevated above the ground and held in frictional driving engagement with wheels of the landing gear; the double dot-dash lines on one of the wheels indicating the caster angle of the trailing wheels when the aircraft is moved by the vehicle in the direction indicated by the arrow above the vehicle, the arrows applied to the driven wheels of the vehicle and the landing gear wheels indicating the direction of rotation of such wheels when moving the aircraft as indicated;

FIG. 4 is an enlarged fragmentary top plan view of the coupled portion of the motor vehicle and the landing gear, showing the driven wheels of the vehicle elevated from the ground and in position to be moved into frictional driving engagement with wheels of the landing gear;

FIG. 5 is a fragmentary sectional view taken on the line 5—5 of Fig. 4;

FIG. 6 is a sectional view corresponding to FIG. 5 showing how the driven elevated wheels of the vehicle are disposed in frictional driving engagement with wheels of the landing gear;

FIG. 7 is an enlarged fragmentary sectional view taken on the line 7—7 of FIG. 4, with the associated portions of the landing gear omitted for clarity;

FIG. 8 is a fragmentary sectional view taken on the line 8—8 of FIG. 7;

FIG. 9 is a sectional view taken on the line 9—9 of FIG. 7;

FIG. 10 is a sectional view taken substantially on the line 10—10 of FIG. 1, showing in elevation the caster mounting for wheels of the vehicle and illustrating in section the portion of the vehicle to which this mounting is secured;

FIG. 11 is a sectional view taken on the line 11—11 of FIG. 10; and

FIG. 12 is a schematic view of the integrated hydraulic circuits and hydraulically actuated devices embodied in the motor vehicle.

As shown in the accompanying drawings, a motor vehicle embodying the present invention includes a low frame and body structure 1, supported by wheel means, here illustratively indicated as including driven wheels 2 and steerable wheels 3.

A suitable internal combustion engine (not shown) or two or more such engines may be employed in the vehicle to drive the wheels 2 and operate the other driven elements of the vehicle, some of which latter are shown diagrammatically in FIG. 12.

It is thought to be unnecessary to show or indicate other than in FIG. 12, the power means and associated driven vehicle parts employed in this vehicle, since it is within the knowledge of persons skilled in this art as to how the vehicle may be equipped with power steering means, power brakes and all other power operated devices common to present day trucks and similar vehicles, with controls therefor operable from the driver's cab 4. In the present case the cab will be equipped with dual steering wheels W and other controls as indicated in FIG. 12, to facilitate operation of the vehicle when moving rearwardly as well as forwardly.

The wheels 2 are driven from the power unit of the vehicle by means of a drive shaft 5, and locked differential means 6, as indicated in FIGS. 4 and 5, it being preferable that an automatic transmission unit T, be employed to drive the shaft 5, and that a suitable reverse gear shift unit 7, as indicated in FIG. 12, be operable in the cab 4.

A salient feature of this invention is the use of vehicle supporting wheel means for frictionally engaging and driving wheel means of the landing gear of an aircraft. Accordingly, as illustratively depicted in FIGS. 5 and 6, the driven wheels 2 are mounted on an axle unit 1a on the vehicle frame 8 so that the peripheries of the pneumatic tires 9 thereof may be frictionally engaged as shown in FIGS. 3 and 6, with the peripheries of the pneumatic tires 10 on wheels 11 of the main landing gear 12 of an airplane 14 (FIGS. 2 and 3).

Before the driven wheels 2 may be moved into frictional driving engagement with the landing gear wheels 11, it is necessary to couple the motor vehicle with the landing gear 12. For this purpose the vehicle is provided with coupling means 15 adapted to embrace an axle unit 16 for a pair of the wheels 11 on the landing gear 12, as shown in FIGS. 3–7. The axle unit 16 is one of a pair supported by the center beam 17 of the landing gear, the coupling means being engageable with the axle unit in line with the beam and between the wheels 11.

Forming a part of the coupling means is locking means generally designated 18 which serves to releasably lock the coupling means to the landing gear in a manner to be hereinafter described, whereby a reliable draft connection may be maintained between the vehicle and the landing gear.

With reference to FIGS. 4–8, it will be seen that the coupling means includes a generally U-shaped coupler head 19, having a short upper leg 19a for overlying the axle unit 16 and a longer lower leg 19b for engaging the underside of the axle unit. The juncture or bight portion 19c of this head is provided with a socket 19d adapted to receive an apertured tow lug 20 fixed on the lower side of the axle unit 16.

The lower leg 19b is provided with a longitudinal depression or groove 19e as shown in FIGS. 7, 8, and 9 adapted to receive a downwardly extending protuberance 20a on the under side of the axle unit 16. When the coupler head is properly engaged with the axle unit 16 the tow lug 20 enters the socket 19d, and the protuberance 20a enters the groove 19e. As shown in FIG. 7, the coupler head is restrained against lateral displacement so that the locking means 18 may be actuated to releasably lock the coupler head in coupled relation to landing gear.

As here shown, the locking means 18 includes a hydraulic cylinder 22 in which a piston 23 is operable to move a locking pin 24 carried by the piston, into and from locked engagement with the tow lug 20 on the landing gear. Fluid lines 22a and 22b lead from a vehicle-carried source of hydraulic fluid pressure which will be hereinafter described, to the cylinder 22 whereby the piston 23 may be operated to extend and retract the pin 24.

The coupling means 15 is power actuated, the coupler head 19 being mounted on the outer end of a rigid piston rod 26 projecting from an hydraulic crowding cylinder 28 which latter is supported by a bracket 29 mounted to swing about the axis of the axle 1a for the driven wheels 2. This cylinder and piston unit in addition to supporting the coupler head 19, serves as a crowding means to urge the driven wheels 2 into frictional driving engagement with the wheels of the landing gear in a manner to be hereinafter described. Hydraulic fluid lines 30 and 31 lead from a vehicle-carried source of fluid under pressure to the cylinder 28 for actuating the piston 26 to move the driven wheels 2 into and from engagement with the landing gear wheels.

The coupler head 19 is mounted to articulate whereby it may be coupled readily to the landing gear. For this purpose the mid portion of the coupler head 19 is pivoted as at 33 to the outer end of the piston rod 26 and is connected by a pair of links 34 and 35 to the cylinder 28. These links with the aid of a spring 34a hold the head in proper position but permit articulation of the head as required to cause it to embrace the axle unit 16 on the landing gear. The spring 34a is mounted on a guide pin 34b fixed at its lower end to a sleeve 34c rotatably supported by a bracket arm 34d carried by the cylinder 22. The upper end of the pin 34b is slidable in a slot 34e formed in bracket 34f fixed to the piston rods 26. The spring 34a is confined between a keeper 34g on the upper part of the pin 34b and a flange 34h at the lower end of the pin. With this arrangement, the coupler head 19 when lowered to the position shown in FIG. 2 is held in position to embrace the axle unit 16 and will yield downwardly by reason of the spring 34a should the head cam downwardly upon engaging the axle unit 16; thereby making the head somewhat self-aligning.

Positioning means are provided to move the coupling means between the out-of-the-way upright position shown in FIG. 1, into the ready-to-couple position shown in FIG. 2. This positioning means also serves to elevate the driving wheels 2 from the ground into the position shown in FIGS. 4 and 5, from which position these wheels may be moved by the crowding cylinder 28 into frictional driving engagement with the landing gear wheels.

As here shown, the positioning means comprises a pair of hydraulic positioning cylinders 37 pivotally mounted as at 38 on the body 1 and operable for extending and retracting pistons 39. These pistons are pivotally coupled to bell cranks 40 in turn pivoted as at 41 on the body 1. Links 42 pivotally connect the bell cranks 40 to crank arm extensions 43 of the pivoted mounting bracket 29 for the crowding cylinder 28. Hydraulic fluid lines 44 and 45 supply fluid under pressure from the source on the vehicle for operating the positioning cylinders. The pivots 38 for the cylinders 37 permit limited movement of the cylinder about a horizontal axis.

When the positioning cylinders 37 have been operated to dispose the coupler head 19 in the position shown in FIG. 2, the coupling of the vehicle is effected by advancing the vehicle with the coupler head 19 aligned with the center beam on the landing gear, until the coupler head encompasses the axle unit 16 as hereinbefore noted, after which the locking engagement of the pin 24 with the tow lug 20 on the landing gear is effected to complete the coupling operation.

Following this coupling operation actuation of the positioning cylinders 37 to retract the pistons 39 will transmit a force through links 42, and crank arm extensions 43, to turn the bracket 29 about the axle 1a in a clockwise direction. As the bracket 29 in effect is a part of the draft connection between the vehicle and the landing gear, the adjacent end of the vehicle will be lifted in response to this movement of the bracket 29, thereby lifting the wheels 2 off the ground into the position shown in FIGS. 5. The links 42 and the bell cranks 40 assume the position shown in FIG. 5 when this lifting of the wheels 2 is effected and therefore resist further clockwise movement of the bracket 29, thereby providing a rigid draft connection between the vehicle and the landing gear.

After the wheels 2 are elevated from the ground, the crowding cylinder 28 is operated to retract the piston rod 26 and this causes the vehicle to be moved bodily toward the landing gear so that the tires 9 on the driven wheels 2 are disposed and held under pressure in frictional driving engagement with the tires 10 on the landing gear wheels 11. Driving of the wheels 2 at this time will cause the landing gear wheels 11 aided by weight of the aircraft as to traction, to propel the aircraft in the desired direction, the vehicle either freely trailing the aircraft or being pushed freely thereby, with the pilot of the aircraft under full command as to steering the aircraft and the vehicle attached thereto. However, in some instances where sharp turns of the aircraft are to be executed, provision is made, as will be hereinafter described, for the driver of the vehicle to steer the vehicle as an aid to execution of such sharp turns.

An exceptional degree of maneuverability of the aircraft propelled by a vehicle embodying the present invention is made possible by novel means for changing the caster angle of the steerable wheels 3 of the vehicle automatically according to the direction of travel. Moreover, this castering action prevents damage of the landing gear.

FIGS. 10 and 11 show the mounting means for the wheels 3 which makes it possible to dispose these wheels at the proper caster angle according to the direction of travel of the vehicle. The mounting for each wheel 3 is in the form of an inverted U-shaped yoke 48 having the lower end of one leg 48a formed with a bifurcation 48b to receive a pivot pin 49 extended through a bearing 50 fixed on the side portion 51 of the vehicle frame.

The legs 48a and 48c of each yoke are separate members fastened together in side-by-side relation by means of the flanges 52 bolted one to the other. As the wheels 3 are steerable, the outer leg 48c of each yoke 48 is fixed to a wheel-carried socket member 53 of the associated wheel 3. The usual steering means, a part 53a of which is shown in FIG. 10, is arranged so that the wheel 3 there shown, may turn about a vertical axis provided by the yoke 48 when the vehicle is steered. FIG. 12 shows the remainder of the steering means for the vehicle.

The outer legs 48c of each yoke preferably comprises any suitable shock absorber which includes a cylinder 57 and a piston 58. The cylinder 57 is fastened to the leg portion 48a of the yoke by means of the bolted flanges 52, whereas the piston 58 is fixed to the wheel-carried socket member 53 of the associated wheel. The piston 58 will turn freely in the cylinder 57 in the steering of the wheel. The pivotal mounting of the yokes 48 on the pivot pins 49 make it possible to tilt the yokes as necessary to provide the proper caster angle for the wheels 3.

Power operated means are provided to move the yokes 48 alike for changing the caster angle of the wheels 3. As here shown, this means includes a hydraulic cylinder 60 for each yoke. Each cylinder 60 is pivoted as at 61 on a side portion 62 of the vehicle frame. Each cylinder is provided with a reciprocable piston 63 pivoted as at 64 to the upper end of the associated yoke 48.

Control means are provided for the cylinders 60 so that the wheels 3 of the vehicle will be disposed at the proper caster angle when the vehicle is moved forwardly, as shown in FIG. 2 as well as when moved rearwardly as shown in FIG. 1. As here provided this control means operates the cylinders 60 to change the caster angle in response to actuation of the reverse gear shift means 7 indicated diagrammatically in FIG. 12.

Another control means operable in conjunction with the coupler head locking means 18, is provided to co-operate with the reverse gear actuated control means. The manner in which the cylinders 60 are actuated and controlled to change the caster angle of the wheels 3 will be hereinafter fully described.

FIG. 12 diagrammatically illustrates the hydraulic circuits and control valves for actuating and controlling the positioning cylinders 37, the crowding cylinder 28, the coupling locking cylinder 22, the caster angle changing cylinders 60 and the hydraulically operated steering elements which latter, will be hereinafter identified and described.

The hydraulic circuit for operating the crowding cylinder 28, the positioning cylinders 37, the locking cylinder 22 and the cylinders 60 for changing the caster angle includes a high pressure hydraulic pump 66 which is operated by the main power plant, that is, one of the vehicle carried internal combustion engines, not shown. A fluid reservoir 67 is coupled to the pump 66 through a fluid line 68.

In the cab 4 of the vehicle are a crowding cylinder valve 69, a positioning cylinder valve 70, a steering override valve 71 and a coupler valve 72. These valves have suitable handles 69', 70', 71', and 72' respectively for effecting the operation thereof.

The crowding cylinder valve 69, the positioning cylinder valve 70 and the coupler valve 72 are four way valves and are connected with the pump 66 and the reservoir 67 by means of a pressure line 74 and a return line 75 respectively. The fluid lines 30 and 31 for the crowding cylinder 28 are connected with the valves 69. The fluid lines 44 and 45 for the positioning cylinder 37 are connected with the valve 70. Similarly the fluid lines 22a and 22b for the coupling cylinder 22 are connected with the valve 72. With this arrangement the valves 69, 70, and 72 for actuating the cylinders 28, 37, and 22 may be selectively operative by the driver of the vehicle.

If desired, a second 4-way crowding cylinder valve 69a and a second 4-way positioning cylinder valve 70a shown only in FIG. 12, may be located on the exterior of the vehicle somewhere near the end of the vehicle at which the driven wheels 2 are mounted so that an operator on the ground may operate the crowding and positioning cylinders rather than through operation of the valves 69 and 70 in the cab. These extra valves 69a and 70a are connected with a branch 74a of the pressure line 74 and with a branch 75a of the return line and are also connected with branches 30a and 31a of the lines 30 and 31 as well as with branches 44a and 45a of the lines 44 and 45.

The caster cylinders 60 are operated and controlled by means of a 4-way caster valve 78 actuated by cam means 79 which shifts the valve when transmission shift means 7 of the vehicle is operated to change the direction of rotation of the driven wheels 2. The valve 78 is coupled to a branch line 74b of the pressure line 74 and with a branch line 75b of the return line 75. From the valve 78 fluid lines 78a and 78b lead to a fluid pressure actuated pilot control valve 80 which controls flow to both caster cylinders 60, through lines 80a and 80b. But one caster cylinder is shown in FIG. 12, as it is obvious that branches of lines from line 80a and 80b will lead to the caster cylinder for the other wheel 3.

The pilot valve 80 is actuated by fluid pressure from the coupling pin cylinder lines 22a and 22b, there being fluid lines 80c and 80d leading from lines 22a and 22b respectively, to the valve 80. The purpose of valve 80 is to reverse the flow of fluid under pressure to the cylinders 60 when the coupling pin cylinder 22 is operated to lock the coupler head 19 to the landing gear. This is necessary as when the vehicle has been driven in the direction shown in FIG. 2 to effect the coupling thereof with the aircraft landing gear as shown in FIG. 3, the direction of rotation of the driving wheels 2 must be reversed to impart a driving force to the aircraft wheel 10 for moving the aircraft forwardly, that is in the same direction as the vehicle was moved into coupling position. The gear shift means 7 must therefore be operated to so reverse the direction of rotation of the wheels 2 and this will cause the cam means 79 to assume the position shown in FIG. 12. This shifts the valve 78 to a position to direct flow of pressure fluid from line 74b through passage a in the valve 78 and line 78a to the valve 80, thence thru passage b in valve 80 and lines 80a to the left ends of the caster cylinders 60. This would reverse the wheels to a caster angle which would be improper for the trailing wheels 3 when moving the aircraft in the forward direction as afore-mentioned. Consequently, incident to the actuation of the locking or coupling pin cylinder 22 to lock the coupler head 19 to the landing gear as a result of appropriate actuation of the locking or coupling pin cylinder 22 to lock the coupler head 19 to the landing gear as a result of appropriate actuation of the coupler valve 72, the pilot valve 80 is shifted to reverse the flow to the caster cylinders 60. This shifting is effected by fluid pressure from line 22a through the line 80c to actuate the valve 80 for effecting the reversal of flow, so that the fluid will then pass from line 78a across the valve 80 thru the passage c therein to lines 80b leading to the right ends of the cylinders 60, thereby maintaining the same caster angle of the wheels 3 as when the vehicle was advanced into coupling position. During the direction of fluid under pressure to the right ends of the cylinders 60, in the manner above noted, fluid is returned from the left ends of these cylinders thru the lines 80a, valve passage f, line 78b, valve passage h in valve 78 and thence to the return line 75b.

After the vehicle has been advanced in the direction shown in FIG. 2 and coupled, the aircraft, as shown in FIG. 3, should it be desired to back up the aircraft, the driven wheels 2 should be driven in the same direction as when the vehicle is driven toward the landing gear. Consequently, no actuation of the shift means 7 on the vehicle is required, but it is necessary that the caster angle of the wheels 3 be changed for an efficient backing-up movement of the aircraft under the power supplied by the vehicle. Since no actuation of the shift means 7 takes place, the pilot valve 80 must be depended upon to direct fluid to the caster cylinders 60 for disposing the wheels 3 at the proper caster angle.

The manner in which the valves 78 and 80 control the flow of fluid to the caster cylinders 60 when the shift means is not operated to assume the position shown in FIG. 2 is as follows:

Before the cylinder 22 is actuated to move the pin 24 to lock the coupler head 19 to the landing gear, and while the wheels 3 are in the caster angle shown in FIGS. 3 and 12, the caster valve 78 and the pilot valve 80 are in positions opposite that indicated in FIG. 12. The caster valve 78 is in that opposite position because when the vehicle is being propelled by the wheels 2 into direction indicated in FIGS. 2 and 3 and the shift means 7 is in the position opposite that shown in FIG. 12, the valve 78 causes flow of pressure fluid through valve passage d, line 78b, passage e in valve 80 and lines 80b to the right ends of the two caster cylinders 60, thus providing the caster angle of the wheels 3 as shown in FIGS. 2, 3, and 12. During the direction of fluid in this manner to the right ends of the cylinders 60, fluid is returned from the left ends of these cylinders thru lines 80a, passage b in valve 80, line 78a, passage g in valve 78, and thence to the return line 75. At this time the pilot valve 80 is in the position opposite that indicated in FIG. 12, since the lock pin 24 will have been previously retracted. In this retraction of the pin 24 fluid under pressure is directed to the cylinder 22 through the line 22b and the pressure in this line at that time is effective through line 80d to shift the valve 80 to said position permitting flow therethrough from line 78b to lines 80b thence to the right ends of the two cylinders 60 as above described.

When the cylinder 22 is operated to lock the coupler head 19 to the landing gear and it is desired to back-up the aircraft, the pressure in line 22a leading to cylinder 22 is effective in the line 80d to move the valve 80 into a position such that the fluid under pressure in the valve passage d in the valve 78 will be effective in line 78b, across valve 80 thru valve passage f into lines 80a leading to the left ends of the cylinders 60. This will cause the pistons operated by the cylinders 60 to be retracted so as to shift the yokes 48 to move the wheels 3 into the caster angle shown in FIG. 1, which is suitable for movement of the vehicle in the direction indicated in FIG. 1, as when backing up the aircraft or moving it in that direction. During the flow of fluid under pressure in this manner to the left ends of the cylinders 60, the fluid from the right ends of these cylinders is returned thru lines 80b, passage c in valve 80, line 78a, passage g in valve 78, and thence to the return line 75b.

In accordance with this invention the power steering means for the vehicle has associated therewith means which makes it possible for free movement of the steerable wheels 3 independently of steering control from the cab 4, when the driven wheels 2 are operated to propel the aircraft while the pilot of the aircraft effects the steering of the aircraft. However, the steering override valve 71 and associated means in the steering system makes it possible for the driver of the vehicle steering the wheels 3, if thus desired, to assist in making sharp turns.

FIG. 12 schematically shows that the power steering mechanism which generally is conventional except for the control elements associated therewith as here provided, includes a hydraulic pump 90 driven by an engine (not shown) of the vehicle. Hydraulic fluid is supplied to the pump 90 through a line 90a leading from the reservoir 67. In accordance with this invention the pressure line 91 from the pump leads to spring-loaded and fluid pressure actuated valve 92. From the valve 92 a fluid line 92a leads to a steering valve 93 that is actuated by the dual steering wheel unit W. A return fluid line 92b leads from the valve 93 to the valve 92 and to the reservoir 67. The valve 93 directs fluid under pressure through lines 94a and 94b to fluid pressure actuated shuttle valves 95 and 96 which in turn direct fluid under pressure through lines 97 and 98 to opposite ends of a hydraulic steering cylinder 99. The piston 99a of the cylinder 99 operates a pitman arm 100. The arm 100 forms a part of the usual mechanical steering unit 100a connected with steering wheels as is customary to provide for mechanical steering in case of failure of the power steering means. This pitman arm provides for transmitting motion to a conventional valved drag link 101 of the type known in the trade as a Garrison control valve and drag link assembly and which in this instance is pivoted at its ends to the crank arm 100 and to the tie rod 102 respectively. This tie rod is connected with the steering arms 103 of the wheels 3.

As schematically shown in FIG. 12, the control valve and drag link assembly 101 includes a piston-like valve unit 101a that is initially moved mechanically by means of a rod 101b operable in a cylinder 101c. After this initial mechanically effected movement the valve unit 101a is moved by fluid pressure to direct fluid under pressure selectively to the shuttle valves 95 and 96. Accordingly, a pressure line 105 leads from the valve 92 to the valve unit 101a while lines 106 and 107 lead from this valve unit to the shuttle valves 95 and 96, respectively. A return line 105a leads from the valve unit 101a to the reservoir through line 92b.

In order that cylinder 101c and the rod 101b function as a drag link, one end of this cylinder is pivoted to the pitman arm 100 and the outer end of the rod 101b is pivoted to the tie rod 102. A pair of springs 101d are mounted in the cylinder 101c on opposite sides of the pivotal connection of the rod 101b with the tie rod 102, so as to yieldingly resist movement of the rod 101b and piston-like valve unit 101a. Thus, upon steering from the vehicle cab 4 the force for moving the tie rod 102 and steering the wheels 3 is transmitted from the pitman arm 100 to the cylinder 101c and rod 101b through the springs 101d and these elements then function as a drag link.

However, when the vehicle is coupled with an aircraft, this drag link functions through its valve unit 101a and elements associated therewith, as will be hereinafter described, so as to prevent the vehicle wheels 3 from being steered from the vehicle cab 4 and to remove from these wheels any friction load or other load that otherwise might be applied to the vehicle wheels by reason of the conventional mechanical drive unit 100a which connects the steering unit in the cab 4 with the drag link 101 through the pitman arm 100. Free from such a load, the wheels 3 of the vehicle will track freely with relation to the aircraft while the vehicle coupled thereto is steered from the pilot's cabin in the aircraft.

In some cases it may be desired to have the vehicle steered from the cab 4 to assist the aircraft pilot in making sharp turns. In such cases the steering override valve 71 is operated. FIG. 12 shows how the valve 71 is connected with the fluid pressure line 22a leading to coupling valve 72, there being a pressure line 108 coupled to the line 22a so that when the coupler valve 72 is operated to actuate the cylinder 22 for locking the coupler head 19 to the aircraft, fluid under pressure will flow to the override valve 71. A return line 109 returns fluid from the valve 71 to the return line 75. A fluid pressure line 110 connects the valve 71 with the spring loaded valve 92. The manner in which the valves 71 and 92 operate to control the steering system will now be described.

The spring loaded valve 92 normally is held in a position by its spring (not shown) so that, as indicated in FIG. 12, fluid pressure from the pump 90 is effective through line 91, passage 91a in the valve 92, line 92a up to the steering valve 93. The valve 93 is then subject to actuation by the steering wheel unit in the vehicle cab 4 in the usual manner, to cause one or the other of the shuttle valves 95 and 96 to direct fluid under pressure to either end of the steering cylinder 99, thereby through the pitman arm 100, drag link 101, and the rod 102, effecting the steering of the wheels 3. In this instance the valve unit 101a in the drag link is inoperable whereby the drag link only functions as a link.

When the vehicle is coupled to the aircraft, the operation of the coupler valve 72 to actuate the locking cylinder 22 for moving the locking pin 24 into locked engagement with the landing gear, causes fluid pressure in line 22a to be effective through the line 108 to the override valve 71. Normally the valve 71 is in a position such that fluid under pressure from line 108 will be effective through a passage 71a in the valve thence in the line 110 leading to the valve 92. In response to this pressure from the line 110, the valve 92 is shifted against the action of its spring, into a position causing the pressure fluid from the pump 90, to pass through a passage 91b in the valve 92, thence through the line 105 to the valve unit 101a in the drag link 101. This shuts off fluid pressure to the steering valve 93 and thus renders this valve inoperable, in response to manipulation of the two steering wheels in the cab 4 of the vehicle. Ordinarily however, the mechanical steering unit 100a would still be effective to steer the wheels 3 in response to the steering wheels in the vehicle cab, but this steering action is rendered ineffective by the valve action of the drag link valve unit 101a and the resultant operation of the power steering cylinder 99 which latter overcomes any movement of the pitman arm 100 that might be transmitted from the vehicle steering unit in the cab through the mechanical steering unit 100a.

The rod 101b will move a limited extent against the action of one or the other of the springs 101d under forces transmitted thereto from the wheels 3 in the turning thereof and this mechanically effected movement causes the piston-like valve unit 101a to move sufficiently to allow fluid under pressure from the line 105 to further move the piston-like unit 101a to an extent permitting the fluid under pressure to pass through either line 106 or line 107 to one of the shuttle valves 95 or 96, depending upon the direction of movement of the rod 101b and valve unit 101a, thereby actuating the cylinder 99 to counteract any force that might be transmitted from the mechanical steering unit 100a through the pitman arm 100. This causes the trailing wheels 3 of the vehicle to track freely without interference.

It should be noted that instead of using the Garrison control valve and drag link herein referred to as the valved drag link 101 and schematically shown in FIG. 9, any other link and valve unit may be used provided it will effect the operation of the shuttle valves 95 and 96 in the manner herein noted responsive to forces transmitted thereto by the wheels 3 and also serve as a drag link for steering purposes.

If it is desired to render the steering unit in the cab 4 operable while the vehicle is coupled in driving relation to the aircraft the steering override valve 71 is operated by means of its handle 71' to assume a position shutting off pressure through the valve passage 71a and thereby permitting the spring loaded valve 92 to return to normal position directing fluid under pressure to the steering valve 93. When the valve 92 is thus shifted the pressure through line 105 is shut off rendering the valve 101a in the drag link inoperable to control the flow of pressure fluid to the shuttle valves and the power cylinder 99.

Assuming the valve 101a in the drag link 101 is operative to overcome forces upstream from the pitman arm 100, at the time it is desired to uncouple the vehicle from the aircraft, upon now retracting the locking pin 24, the steering system is restored from the normal operation from the cab 4 of the vehicle. When the pin 24 is retracted, the valve 72 is operated to direct fluid pressure through the line 22b and this shuts off pressure in the line 22a thereby relieving the pressure in the line 108, valve passage 71a, line 110 and valve 92, thus permitting the spring actuated valve 92 to return to the normal position aforementioned.

While the specific details of the invention have been herein shown and described, changes and alterations may be resorted to without departing from the spirit thereof as defined in the appended claims.

We claim:

1. A motor vehicle for moving on the ground an airplane having a wheel landing gear, the motor vehicle including: wheel means for driving wheels of said landing gear; means for driving said wheel means; coupling means for releasably connecting said vehicle with said landing gear; crowding means connecting said coupling means with the vehicle; said crowding means being movable to support said coupling means in a position to be coupled to said landing gear; positioning means connected with said crowding means and said vehicle; means for operating said positioning means to move said crowding means into said position; and means for operating said crowding means to crowd said wheel means into driving engagement with said wheels of said landing gear while said coupling means is coupled to said landing gear.

2. A motor vehicle for moving on the ground an airplane having a landing gear equipped with wheel means, the motor vehicle including: wheel means operable on said vehicle for frictionally driving said wheel means of said landing gear; means for driving said wheel means on said vehicle; coupling means operable for releasably connecting said vehicle with said landing gear; crowding means supporting said coupling means; means mounting said crowding means on said vehicle for swinging movement about an axis to dispose said coupling means in a position to be coupled to said landing gear; positioning means connecting said crowding means with said vehicle; means for operating said positioning means to swing said crowding means about said axis into said position; and means for operating said crowding means to crowd said wheel means in said vehicle into frictional driving engagement with said wheel means of said landing gear while said coupling means is coupled to said landing gear.

3. A motor vehicle for moving on the ground an aircraft having a wheeled landing gear, the motor vehicle including: ground engaging wheels; means for driving a pair of said wheels; a hydraulic crowding unit mounted on the vehicle to swing about an axis; said unit including a cylinder member and a piston member; a coupling head on one of said members of said unit for engaging said landing gear; means on said head for releasably locking said head to said landing gear; positioning means on said vehicle connected with said crowding unit for moving the latter about said axis to lift an end of said vehicle so as to elevate said driven wheels from the ground; and means for operating said crowding unit to force said elevated wheels under pressure into frictional driving engagement with the wheels of said landing gear.

4. A motor vehicle for moving on the ground an aircraft having a wheeled landing gear, the motor vehicle including: pairs of ground engaging wheels; means for driving a pair of said wheels; a hydraulic cylinder and piston crowding unit mounted on the vehicle to swing about a horizontal axis; a coupling head on the piston of said unit for engaging said landing gear; means on said head for releasably locking said head to said landing gears; a hydraulic cylinder and piston positioning unit on said vehicle; linkage connecting the piston of said positioning unit with said crowding unit operable to lift one end of the vehicle to elevate said driven wheels from the ground upon movement of the piston of the positioning unit; and means for operating said crowding unit to force said elevated wheels into frictional driving engagement with wheels of said landing gear.

5. A motor vehicle for moving on the ground an aircraft having a wheeled landing gear, the motor vehicle including: pairs of ground engaging wheels; means for driving a pair of said wheels; a hydraulic piston and cylinder crowding unit mounted to move about an axis on the vehicle; a coupling head pivoted on the piston of said unit; linkage between the cylinder of said unit and said head for maintaining said head in position for engaging a portion of said landing gear; means on said head for releasably locking said head to said landing gear; a hydraulic cylinder and piston positioning unit mounted on said vehicle; linkage connecting said cylinder of said crowding unit with the piston of said positioning unit for lifting one end of the vehicle to elevate said driven wheels from the ground in response to movement of said piston of said positioning unit; and means for operating said crowding unit to urge said elevated wheels under pressure into frictional driving engagement with wheels of said landing gear.

6. A motor vehicle for moving on the ground an aircraft having a wheeled landing gear, the motor vehicle including: ground engaging wheels; means for driving a pair of said wheels; a hydraulic cylinder and piston crowding unit; means mounting said unit to swing about the axis of said driven wheels; a coupling head mounted on the piston of said unit for engaging the landing gear; hydraulically operable means on said head for locking said head to said landing gear; hydraulic positioning means on said vehicle; crank arm means fulcrumed on said vehicle; means connecting said positioning unit with said crank arm means; linkage connecting said crank arm means with said crowding unit operable to move said unit so as to lift one end of the vehicle to elevate said driven wheels from the ground in response to operation of said positioning means; and means for operating said crowding unit to force said elevated driving wheels into frictional driving engagement with the wheels of said landing gear.

7. A motor vehicle for moving on the ground an aircraft having a wheeled landing gear, the motor vehicle including: a body; wheels on said body; means for driving a pair of said wheels; coupling means for effecting a draft connection of the vehicle with the landing gear; means connected with said coupling means operable for holding said driven wheels in frictional driving engagement with wheels of said landing gear; caster means mounting other wheels on the vehicle for movement into different caster angles according to the direction of movement of the vehicle; and means operable to change the caster angle of said other wheels incident to changing the direction of rotation of said driven wheels while the latter drive said landing gear wheels.

8. A motor vehicle for moving on the ground an aircraft having a wheeled landing gear, the vehicle including: a vehicle body; a pair of ground-engaging wheels adjacent each end of the body; drive means selectively operable to drive in either direction the pair of wheels adjacent one end of said body; coupling means for effecting a draft connection between said body and said landing gear; positioning means connected with said body operable in cooperation with said coupling means to lift said body to elevate said driven wheels from the ground; crowding means connected with said body operable in cooperation with said coupling means to urge said elevated wheels into frictional driving engagement with wheels of said landing gear; and caster means mounting the other of said wheels on said body for movement into different caster angles; and means operable in response to actuation of said drive means for changing the caster angle of said caster means according to the direction of rotation of said driven wheels.

9. A motor vehicle for moving an aircraft along the ground by applying a driving force to wheels of the landing gear of the aircraft, the motor vehicle including: a vehicle body; a first pair of ground-engaging wheels on said body; a second pair of ground-engaging wheels on said body; drive means selectively operable to drive said first pair of wheels in either direction; caster mounting means on said body supporting said second pair of wheels for movement into different caster angles according to the direction of travel of the vehicle; actuating means for said caster mounting means operatively connected with said selectively operable drive means and said caster mounting means, operable to change the caster angle of said second pair of wheels in response to the actuation of said drive means to change the direction of rotation of said first pair of wheels; coupling means connected with said vehicle; means for operating said coupling means for effecting a draft connection between the aircraft and said vehicle; positioning means operatively associated with said vehicle and said coupling means; means for operating said positioning means to move said first pair of wheels off the ground; crowding means for moving said first pair of wheels into frictional driving engagement with said wheels of said landing gear; caster control means operatively associated with said caster actuating means and said coupling means for operating said caster actuating means to change the caster angle of said second pair of wheels in response to said draft connection being effected by said coupling means.

10. A motor vehicle for moving an aircraft along the ground by applying a driving force from wheels of the vehicle to wheels of the aircraft landing gear; the motor vehicle including: a body; a first pair of ground-engaging wheels on the body; a second pair of ground-engaging wheels on the body; means on the body selectively operable to drive said first pair of wheels in either direction; a hydraulic unit mounted on said body; said unit including a hydraulic cylinder member; a piston member operable in the cylinder member; a coupler head pivoted on one of said members; said head having opposed portions for embracing a part of said landing gear; links pivotally connected with said head and the other of said members for controlling pivotal movement of said head; means for locking said head to said landing gear; means on said vehicle cooperable with said hydraulic unit for elevating a portion of said vehicle to lift said first pair of wheels from the ground; and means cooperable with said unit for forcing said elevated wheels into frictional driving engagement with wheels of said landing gear.

11. A motor vehicle for moving an aircraft along the ground by applying a driving force from wheels of the vehicle to wheels of the aircraft landing gear; the motor vehicle including: a body; a first pair of ground-engaging wheels on the body; a second pair of ground-engaging wheels on the body; means on the body selectively operable to drive said first pair of wheels in either direction; a hydraulic unit mounted on said body; said unit including a hydraulic cylinder member; a piston member operable in the cylinder member; a coupler head pivoted on one of said members; said head having opposed portions for embracing a part of said landing gear; spring means connected with said head and said one member for resisting pivotal movement of said head in one direction; means for locking said head to said landing gear; means on said vehicle cooperable with said hydraulic unit for elevating a portion of said vehicle to lift said first pair of wheels from the ground; and means cooperable with said unit for forcing said elevated wheels into frictional driving engagement with wheels of said landing gear.

12. A motor vehicle for moving on the ground an aircraft having a wheeled landing gear; the motor vehicle including: a body; a first pair of ground-engaging wheels on said body; a second pair of ground-engaging wheels; means on the body selectively operable for driving said first pair of wheels in either direction; caster means mounting said second pair of wheels on said body for movement into different caster angles; means connected with said body for coupling the vehicle to the landing gear of an aircraft; means for moving said first pair of wheels into frictional driving engagement with wheels of said landing gear; said caster means for each wheel of said second pair including a member pivoted on said body for fore and aft tilting movement about the pivot thereof; a wheel supporting member carried by said tiltable member for tilting movement therewith and turning movement about its axis relative to said tiltable member; and steering means for the vehicle connected with said second pair of wheels.

13. A motor vehicle for moving along the ground an aircraft having a wheeled landing gear, the motor vehicle including: a vehicle body; a first pair of ground-engaging wheels on said body; means for driving said wheels in either direction; a second pair of ground-engaging wheels; caster means mounting said wheels on said vehicle for movement into different caster angles according to the direction of travel of the vehicle; means for coupling the vehicle to the landing gear of an aircraft; means for elevating said first pair of wheels from the ground; means for urging said elevated wheels into frictional driving engagement with wheels of said landing gear; means operable from the vehicle for steering said second pair of wheels; means for rendering said steering means inoperable from the vehicle while the vehicle is coupled to the landing gear; and means operatively associated with said steering means for rendering said second pair of wheels free to track with relation to the aircraft while the aircraft is being moved along the ground as a result of the frictional driving engagement of said first pair of wheels with said wheels of said landing gear.

14. A motor vehicle for moving along the ground an aircraft having a wheeled landing gear, the motor vehicle including: a vehicle body; a first pair of ground-engaging wheels on said body; means for driving said wheels in either direction; a second pair of ground-engaging wheels; caster means mounting said wheels on said vehicle for movement into different caster angles according to the direction of travel of the vehicle; means for coupling the vehicle to the landing gear of an aircraft; means for elevating said first pair of wheels from the ground; means for urging said elevated wheels into frictional driving engagement with wheels of said landing gear; means operable from the vehicle for steering said second pair of wheels; means operatively associated with said coupling means and said steering means operable in response to said coupling of the vehicle to the landing gear to render said steering means inoperable to steer said second pair of wheels from the vehicle.

15. A motor vehicle for moving along the ground an aircraft having a wheeled landing gear, the motor vehicle including: a vehicle body; a first pair of ground-engaging wheels on said body; means for driving said wheels in either direction; a second pair of ground-engaging wheels; caster means mounting said wheels on said vehicle for movement into different caster angles according to the direction of travel of the vehicle; means for coupling the vehicle to the landing gear of an aircraft; means for elevating said first pair of wheels from the ground; means for urging said elevated wheels into frictional driving engagement with wheels of said landing gear; means operable from the vehicle for steering said second pair of wheels; means operatively associated with said coupling means and said steering means operable in response to said coupling of the vehicle to the landing gear to render said steering means inoperable to steer said pair of wheels from the vehicle; and means operable at will on the vehicle for restoring said steering means for operation to steer said second pair of wheels while ground movement of the aircraft is being effected by said vehicle.

16. A motor vehicle for moving along the ground an aircraft having a wheeled landing gear, the motor vehicle including: a vehicle body; a first pair of ground-engaging wheels on said body; means on said body selectively operable for driving said wheels in either direction; a second pair of ground-engaging wheels; caster means mounting said wheels on said vehicle for movement into different caster angles according to the direction of travel of the vehicle; means for coupling the vehicle to the landing gear of an aircraft; means for urging said first pair of wheels into frictional driving engagement with wheels of said landing gear; means operable on the vehicle for steering said second pair of wheels; means for releasably locking said coupling means to said landing gear; and means operable in response to operation of said locking means for rendering said steering means inoperable from the vehicle to steer said second pair of wheels.

17. A motor vehicle for moving along the ground an aircraft having a wheeled landing gear, the motor vehicle including: a vehicle body; a first pair of ground-engaging wheels on said body; means on said body selectively operable for driving said wheels in either direction; a second pair of ground engaging wheels; caster means mounting said wheels on said vehicle for movement into different caster angles according to the direction of travel of the vehicle; means for coupling the vehicle to the landing gear of an aircraft; means for urging said first pair of wheels into frictional driving engagement with wheels of said landing gear; means operable on the vehicle for steering said second pair of wheels; means for releasably locking said coupling means to said landing gear; means operable in response to operation of said locking means for rendering said steering means inoperable to steer said second pair of wheels; and means operable at will on said vehicle for rendering said steering means operable to steer said second pair of wheels while said coupling means is locked to said landing gear.

18. A motor vehicle for moving along the ground an aircraft having a wheeled landing gear, the motor vehicle including: a vehicle body; a first pair of ground-engaging wheels on said body; means on said body selectively operable for driving said wheels in either direction; a second pair of ground-engaging wheels; caster means mounting said wheels on said vehicle for movement into different caster angles according to the direction of travel of the vehicle; means for coupling the vehicle to the landing gear of an aircraft; means for urging said first pair of wheels into frictional driving engagement with wheels of said landing gear; means operable on the vehicle for steering said second pair of wheels; means for releasably locking said coupling means to said landing gear; means operable in response to operation of said locking means for rendering said steering means inoperable to steer said second pair of wheels; and means operatively connected with said caster means and said locking means operable in response to the locking action of said locking means to change the caster angle of said second pair of wheels.

19. A motor vehicle for moving along the ground an aircraft having a wheeled landing gear, the motor vehicle including: a vehicle body; a first pair of ground-engaging wheels on said body; means on said body selectively operable for driving said wheels in either direction; a second pair of ground-engaging wheels; caster means mounting said wheels on said vehicle for movement into caster angles according to the direction of travel of the vehicle; means for coupling the vehicle to the landing gear of an aircraft; means for urging said first pair of wheels into frictional driving engagement with wheels of said landing gear; means operable on the vehicle for steering said second pair of wheels; means for releasably locking said coupling means to said landing gear; means operable in response to operation of said locking means for rendering said steering means inoperable to steer said second pair of wheels; and means operatively connected with said drive means and said caster means operable in response to changing the direction in which said first pair of wheels are driven, for changing the caster angle of said second pair of wheels.

20. A motor vehicle for moving along the ground an aircraft having a wheeled landing gear, the motor vehicle including: a vehicle body; a first pair of ground-engaging wheels on said body; means on said body selectively operable for driving said wheels in either direction; a second pair of ground-engaging wheels; caster means mounting said wheels on said vehicle for movement into different caster angles according to the direction of travel of the vehicle; means for coupling the vehicle to the landing gear of an aircraft; means for urging said first pair of wheels into frictional driving engagement with wheels of said landing gear; means operable on the vehicle for steering said second pair of wheels; means for releasably locking said coupling means to said landing gear; means operable in response to operation of said locking means for rendering said steering means inoperable to steer said second pair of wheels; means operatively connected with said drive means and said caster means operable in response to changing the direction of driving said first pair of wheels, to change the caster angle of said second pair of wheels; and means operatively connected with said caster means and said locking means operable in response to said locking action to change the caster angle of said second pair of wheels.

21. A motor vehicle for moving along the ground an aircraft having a wheeled landing gear, the motor vehicle including: a vehicle body; a first pair of ground-engaging wheels on said body; means on said body selectively operable for driving said wheels in either direction; a second pair of ground-engaging wheels; caster means mounting said wheels on said vehicle for movement into different caster angles according to the direction of travel of the vehicle; means for coupling the vehicle to the landing gear of an aircraft; means for elevating said first pair of wheels from the ground; means for urging said elevated wheels into frictional driving engagement with wheels of said landing gear; means operable from the vehicle for steering said second pair of wheels; locking means associated with said coupling means operable to releasably lock said coupling means to the landing gear; means operatively associated with said locking means and said steering means operable in response to the locking action of said locking means for rendering said steering means inoperable to steer said wheels; means operatively associated with said driving means and said locking means operable in response to changing the direction of driving said first pair of wheels, to change the caster angle of said second pair of wheels; and means operatively connected with said locking means and said caster means operable to change the caster angle of said second pair of wheels in response to said locking action of said locking means.

22. A motor vehicle for moving along the ground an aircraft having a wheeled landing gear, the motor vehicle including: a vehicle body; a first pair of ground-engaging wheels on said body; means on said body selectively operable for driving said wheels in either direction; a second pair of ground-engaging wheels; caster means mounting said wheels on said vehicle for movement into different caster angles according to the direction of travel of the vehicle; means for coupling the vehicle to the landing gear of an aircraft; means for elevating said first pair of wheels from the ground; means for urging said elevated wheels into frictional driving engagement with wheels of said landing gear; means operable from the vehicle for steering said second pair of wheels; locking means associated with said coupling means operable to releasably lock said coupling means to the landing gear; means operatively associated with said locking means and said steering means operable in response to the locking action of said locking means for rendering said steering means inoperable to steer said wheels; means operatively associated with said driving means and said locking means operable in response to changing the direction of driving said first pair of wheels, to change the caster angle of said second pair of wheels; means operatively connected with said locking means and said caster means operable to change the caster angle of said second pair of wheels in response to said locking action of said locking means; and means operable at will from the vehicle for restoring said steering means for operation to steer said second pair of wheels while the vehicle is coupled to the landing gear.

23. A motor vehicle for moving on the ground an aircraft having wheel means on the landing gear, the motor vehicle including: power driven wheel means for frictionally driving wheel means on said landing gear; coupling means for releasably coupling the vehicle to said landing gear; power operated piston and cylinder means supporting said coupling means; means mounting said piston and cylinder means on the vehicle for movement to dispose said coupling means in a position to be coupled to said landing gear; positioning means connecting said power operated piston and cylinder means with said vehicle; means for operating said positioning means for moving said piston and cylinder means to dispose said coupling means in said position; and means for operating said piston and cylinder means to crowd said power driven wheel means into frictional driving engagement with said wheel means on said landing gear.

24. A motor vehicle for moving on the ground an aircraft having wheel means on the landing gear, the motor vehicle including: driving wheel means on the vehicle operable for frictionally engaging and driving wheel means of the landing gear; means for driving said driving wheel means, hydraulically operated crowding unit mounted on the vehicle for movement relative thereto; said unit including a cylinder member and a piston member; coupling means on one of said members for detachable connection with said landing gear; power operated positioning means connecting said crowding means with said vehicle; means for operating said positioning means to move said crowding means for disposing said coupling means in a position to be coupled to said landing gear; and means for effecting relative movement of said piston and cylinder members to crowd said driving wheel means into frictional engagement with said wheel means on the landing gear while said coupling means is coupled to said landing gear.

25. A motor vehicle for moving on the ground an aircraft having a wheel means on the landing gear, the motor vehicle including: ground-engaging wheel means; means for driving ground-engaging wheel means of the vehicle; a hydraulic crowding unit mounted on the vehicle to swing about an axis; said unit including a cylinder member and a piston member; a coupling head on one of said members of said unit for engaging said landing gear; means on said head for releasably locking said head to said landing gear; positioning means on said vehicle connected with said crowding unit for moving the latter about said axis to lift an end of said vehicle and elevate said driven wheel means from the ground; and means for operating said crowding unit to force said elevated driven wheel means under pressure into frictional driving engagement with wheel means of said landing gear.

26. A motor vehicle for moving on the ground an aircraft having a landing gear equipped with wheel means, the motor vehicle including: a body; steerable wheel means on said body; power driven wheel means on said body for frictionally driving wheel means of said landing gear; coupling means for effecting a detachable draft connection of the vehicle with the landing gear; power operated crowding means supporting said coupling means on said body; means mounting said crowding means for movement relative to said body to position said coupling means for effecting said draft connection; positioning means connecting said body with said crowding means; means for operating said positioning means to move said crowding means to dispose said coupling means in said position to be coupled to said landing gear; means for operating said crowding means to crowd said power driven wheel means into said driving engagement with said wheel means of said landing gear while said coupling means is coupled to said landing gear; caster means mounting said steerable wheel means on said body and operable for moving the steerable wheel means into different caster angles; means for driving said power driven wheel means in either direction; and means operable according to the direction of rotation of said power driven wheel means while said coupling means is coupled to said landing gear, for actuating said caster means to dispose said steerable wheel means in a predetermined caster angle.

27. A motor vehicle for moving on the ground an airplane having a landing gear equipped with wheel means, the motor vehicle including: wheel means on said vehicle for frictionally driving said wheel means of said landing gear; means for driving said wheel means on said vehicle; coupling means operable for releasably connecting said vehicle with said landing gear; power operated crowding means; means mounting said crowding means on said vehicle for movement into different positions; means mounting said coupling means on said crowding means; means for operating said crowding means when in one of said positions to crowd said wheel means into driving engagement with wheel means of the landing gear; power operated positioning means; and means interconnecting said positioning means with said vehicle and said crowding means operable upon actuation of said positioning means for moving said crowding means into said one position in which said operation of the crowding means will effect said crowding of said wheel means on the vehicle into said driving engagement with wheel means of said airplane while said coupling means is coupled to said landing gear.

References Cited in the file of this patent
UNITED STATES PATENTS

| | | |
|---|---|---|
| 1,383,566 | Reynolds et al. | July 5, 1921 |
| 2,674,464 | Peterson | Apr. 6, 1954 |
| 2,751,990 | Finlay et al. | June 26, 1956 |